(12) United States Patent
Vishria et al.

(10) Patent No.: US 9,411,900 B2
(45) Date of Patent: *Aug. 9, 2016

(54) INTEGRATED ADAPTIVE URL-SHORTENING FUNCTIONALITY

(75) Inventors: Eric Vishria, San Carlos, CA (US);
Timothy Howes, Los Altos, CA (US);
Robert Churchill, Mountain View, CA (US)

(73) Assignee: Yahoo! Inc., Sunnyvale, CA (US)

( * ) Notice: Subject to any disclaimer, the term of this patent is extended or adjusted under 35 U.S.C. 154(b) by 861 days.

This patent is subject to a terminal disclaimer.

(21) Appl. No.: 13/597,171

(22) Filed: Aug. 28, 2012

(65) Prior Publication Data

US 2012/0324327 A1  Dec. 20, 2012

Related U.S. Application Data

(63) Continuation of application No. 12/765,812, filed on Apr. 22, 2010, now Pat. No. 8,281,232.

(51) Int. Cl.
*G06F 17/00* (2006.01)
*G06F 17/30* (2006.01)
*H04L 29/12* (2006.01)
(Continued)

(52) U.S. Cl.
CPC ...... *G06F 17/30887* (2013.01); *G06F 17/3089* (2013.01); *G06F 17/30876* (2013.01); *G06F 17/30882* (2013.01); *G06F 17/30914* (2013.01); *G06Q 30/02* (2013.01); *H04L 61/301* (2013.01); *H04L 61/6072* (2013.01); *H04L 67/02* (2013.01)

(58) Field of Classification Search
CPC .......... G06F 17/30887; G06F 17/3089; G06F 17/30882; G06F 17/30914; G06F 17/30876; G06Q 30/02; H04L 29/1291; H04L 61/301; H04L 67/02

USPC .................................. 715/200–210, 245, 215
See application file for complete search history.

(56) References Cited

U.S. PATENT DOCUMENTS 8,281,232 B2    10/2012    Vishria et al.
2004/0122848 A1  6/2004    Toivonen et al.
(Continued)

OTHER PUBLICATIONS

WO patent application No. PCT/US11/30060, International Search Report and Written Opinion mailed May 25, 2011.
(Continued)

*Primary Examiner* — Quoc A Tran
(74) *Attorney, Agent, or Firm* — Weaver Austin Villeneuve & Sampson LLP

(57) ABSTRACT

To provide a shortened version of a link that conveys useful information about the link's associated content, embodiments of the invention generate a shortened version of the link that comprises meaningful information about the original link. For example, in some embodiments such information includes portions of the link itself, such as domain and/or path components of the link's address text, content to which the link points, such as the text of a web page or other document referenced by the link's address text, or a rating of the content to which the link points. Thus, rather than generating an essentially random link, embodiments of the invention adaptively generate the shortened link to take into account the information about the link. Consequently, a user viewing the adaptively-generated shortened link can determine useful information about the content to which the shortened link leads based on the text of the shortened link itself.

24 Claims, 4 Drawing Sheets

(51) Int. Cl.
*H04L 29/08* (2006.01)
*G06Q 30/02* (2012.01)

(56) References Cited

U.S. PATENT DOCUMENTS

| | | | |
|---|---|---|---|
| 2007/0043879 A1 | 2/2007 | Vidya Sagar | |
| 2007/0124414 A1* | 5/2007 | Bedingfield et al. | 709/217 |
| 2007/0136279 A1* | 6/2007 | Zhou et al. | 707/6 |
| 2007/0156761 A1* | 7/2007 | Smith, III | 707/104.1 |
| 2008/0109712 A1* | 5/2008 | McBrearty et al. | 715/208 |
| 2009/0271391 A1 | 10/2009 | Kawale et al. | |
| 2010/0088726 A1 | 4/2010 | Curtis et al. | |
| 2011/0191849 A1 | 8/2011 | Jayaraman et al. | |
| 2011/0244882 A1* | 10/2011 | Hancock | 455/456.1 |
| 2011/0264992 A1 | 10/2011 | Vishria et al. | |

OTHER PUBLICATIONS

Wikipedia, "bit.ly," downloaded from http://en.wikipedia.org/wiki/Bit.ly last modified Aug. 11, 2010.

U.S. Appl. No. 12/765,812, Office Action mailed Nov. 28, 2011.

U.S. Appl. No. 12/765,812, Notice of Allowance mailed Aug. 15, 2012.

* cited by examiner

INTEGRATED ADAPTIVE URL-SHORTENING FUNCTIONALITY

CROSS REFERENCE TO RELATED APPLICATIONS

This application is a continuation of U.S. patent application Ser. No. 12/765,812, filed on Apr. 22, 2010, which is incorporated herein by reference.

BACKGROUND

The present invention generally relates to the field of software systems, and more specifically, to techniques for generating shortened versions of links, such as uniform resource locators (URLs), that incorporate useful information associated with the links.

Users of the Internet frequently share URLs related to content of interest. For example, a user might share a web page of interest with the user's friends by typing or pasting the URL into an email, into a text message of a social networking or microblogging service, such as TWITTER, or into a message posting to be placed on the user's page on a social networking site, such as FACEBOOK.

However, the length of URLs often proves inconvenient. For example, a URL having a lengthy domain name and/or path may be inadvertently broken across multiple lines when processed by email systems, thus rendering it incapable of being used directly when clicked on by a recipient of the email. Also, microblogging services, social networking sites, and other online messaging systems may impose maximum character requirements on a user's messages, thereby restricting the use of long URLs in a message. Furthermore, long URLs can appear indecipherable and intimidating to users, leading to user reluctance to click on them. Thus, URL shortening services have been created to facilitate the shortening of URLs and the subsequent use thereof. A typical URL shortening service saves a mapping between an original URL and a shortened version thereof. When a user clicks a shortened URL, the user's computer obtains a page from the URL shortening service, which then redirects the user's computer to the original version of the URL that was associated with the shortened version.

However, the use of shortened URLs may introduce problems of its own. A typical shortened URL replaces the domain name of the original URL with that of the URL shortening service. It also strips out the path in the original URL, replacing it with text having no meaningful relationship to the path of the URL or to the content referenced by the URL. For example, a fictitious URL shortening service with a domain name of short.com might shorten the original URL http://www.interestingsite.com/presentations/gkchesterton/2006/essays.html to http://short.com/qwy128, which gives no indication of either the domain (i.e., www.interestingsite.com) or the path (presentations/gkchesterton/2006/essays.html) of the original URL, nor of what the content in essays.html is about. As a result, a user lacks the ability to determine based on the shortened URL either a location to which the original URL points or the properties of the content that it references. This loss of information leads to an increased risk of a user linking via the shortened URL to unanticipated and undesirable content associated with pranks, phishing, shock, and other malicious actions.

Conventional techniques fail to address these problems, either merely providing a random shortened URL that fails to incorporate useful information, or at best allowing users to request a particular shortened URL of their choice but giving no guidance on the choice and no guarantee that their choice will be available. Instead, existing systems force the users to devise shortened URLs and manually type them in and request them from the URL shortening service.

Further, obtaining a shortened URL using conventional techniques is a burdensome manual process. That is, conventional techniques are not integrated into the messaging services or other contexts in which shortened URLs are commonly used. Rather, the user is obliged (for example) to obtain a shortened URL from a URL shortening service, copy it, switch to the appropriate user interface portion of a messaging service by which the URL is shared, paste in the URL into the appropriate portion of the user interface, and compose whatever explanatory message is desired to accompany the shortened URL.

SUMMARY

To provide a shortened version of a link (e.g., a URL) that conveys useful information about the link's associated content, embodiments of the invention generate a shortened version of the link that comprises meaningful information about the original link. For example, in some embodiments such information includes portions of the link itself, such as domain and/or path components of the link's address text, content to which the link points, such as the text of a web page or other document referenced by the link's address text, or a rating of the content to which the link points. Thus, rather than generating an essentially random link, embodiments of the invention adaptively generate the shortened link to take into account the information about the link. Consequently, a user viewing the adaptively-generated shortened link can determine useful information about the content to which the shortened link leads based on the text of the shortened link itself.

In one embodiment, this adaptive generation of shortened versions of a link is integrated with a user interface in which the user views content associated with the link. For example, in one embodiment the adaptive link shortening functionality is integrated with an application that provides web browsing functionality. When the user takes an action leading to the transmission of a link, such as indicating a desire to share the link associated with the document (or other content) currently displayed in the browser, a plurality of shortened link candidates are generated. The candidates incorporate various portions and degrees of the identified information associated with the link, and the user may select one of the candidates as a substitute for the original, unshortened link, embedding it in a textual message by which the link is shared (for example). The selected one of the shortened link candidates may then be automatically registered with a remote link shortening service, and the message incorporating it sent.

In one embodiment, the adaptive generation takes into account a maximum message length prescribed by a service used to send the shortened link. This maximum length is taken into account when adaptively generating a shortened link. For example, if the message into which the link will be incorporated already contains text, then the shortened link is generated such that the sum of its length and the length of the existing message text does not exceed the maximum message length.

In one embodiment, the service by which the link is sent is selectable within the user interface. For example, a user interface element, such as a selection list, can be provided that allows a user to select whether to send the link within a text message, within a post to a social networking site, within an email, and the like.

The adaptive generation of the shortened link may be performed by different entities in different embodiments. For example, in one embodiment the shortened links are generated on the same client system that provides a user interface for displaying, and allowing a user to select, a shortened link. In another embodiment, the client provides the original link to a server, and the server generates one or more shortened links and provides them to the client, e.g., so that the user can select one of them as a substitute for the original link.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
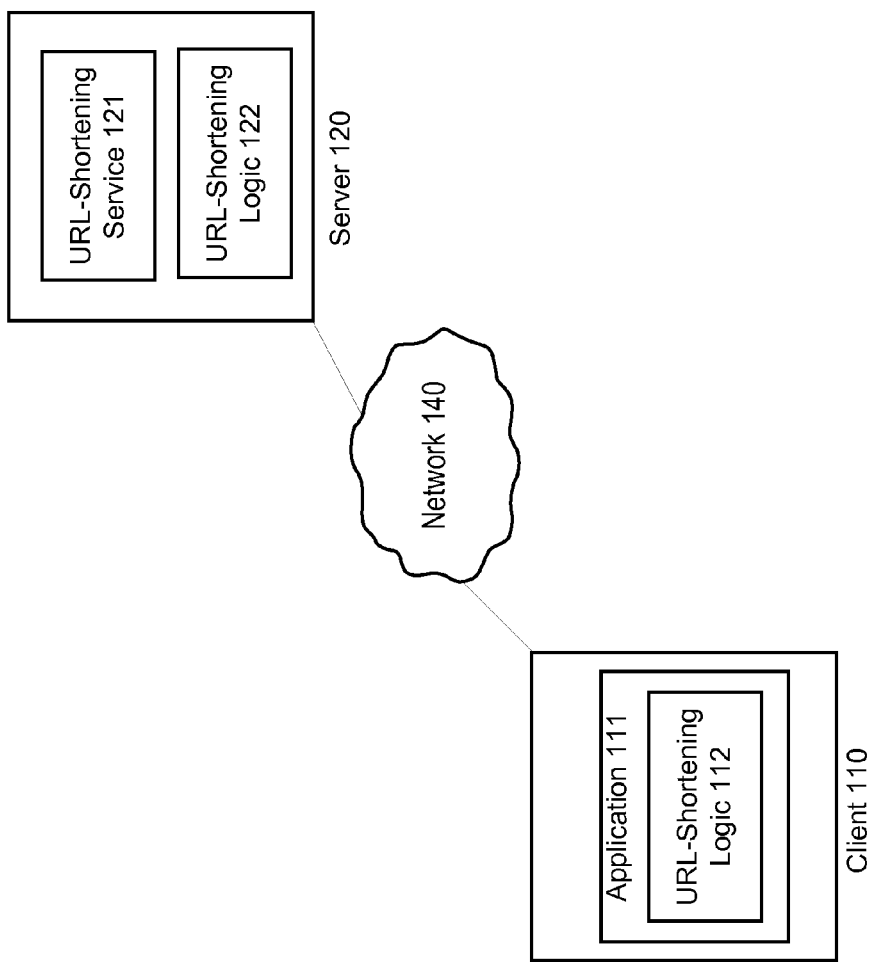
FIG. 1 is a high-level block diagram of a computing environment, according to one embodiment.

FIG. 1 is a high-level block diagram of a computing environment 100 according to one embodiment. FIG. 1 illustrates a client 110 and a server 120 connected by a network 140. A user of the client 110 uses an application 111, such as a web browser, that can communicate with the server 120. The application 111 comprises a user interface for sending a link to a destination, such as by embedding the link within a textual message created within the user interface, and for displaying one or more shortened versions of the link and allowing the user to choose one of the shortened link candidates to be embedded in the message. A "link," as described herein, comprises address text that points to a document or other content available via a network such as the Internet. One common example of a link is a uniform resource locator (URL), which has address text such as http://www.mysite.com/articles/news.htm pointing to a document news.htm, and the description set forth below is in terms of URLs. However, it is appreciated that links are not limited to URLs, but may include uniform resource identifiers (URIs) or other textual means of identifying documents or other content.

The server 120 provides a conventional URL shortening service 121 that registers a URL in association with a shortened version of the URL, the shortened version of the URL having a domain name corresponding to the server 120. Referring to an earlier example, the original URL http://www.interestingsite.com/presentations/gkchesterton/2006/essays.html might be shortened to http://short.com/qwy128. (For purposes of future discussion, note that a URL is of the form protocol://username:password@domain:port/path?query_string#anchor, where many of these components are optional. Thus, the original URL above has protocol "http", domain "www.interestingsite.com", and path "presentations/gkchesterton/2006/essays.html".) Requests for the shortened URL are made to the server 120 (e.g., to a system corresponding to the domain short.com), and its URL shortening service 121 looks up the original URL based on the path portion of the shortened URL (e.g., qwy128), determines the associated original URL, and causes a redirect to the content associated with the original URL, e.g., via an automatic HTTP redirect using HTTP 3xx status codes.

In one embodiment, the URL shortening service 121 permits a client 110 to request a particular shortened URL to correspond to the original URL, rather than automatically assigning a shortened URL without input from the client. In this embodiment, the application 111 on the client 110 can further comprise URL-shortening logic 112 that itself generates the one or more shortened versions of the URL from which the user can choose, and the URL shortening service merely receives the request for a particular shortened URL and—if the shortened URL is available (i.e., is not already in use)—registers the association between it and the original URL. In another embodiment, URL-shortening logic 122 is located on the server 120 and generates the one or more shortened versions of the URL (hereinafter referred to as "shortened URL candidates"), providing them to the application 111 where they are displayed for selection by the user.

The server 120 and the URL shortening service 121 can be under the control of the same entity that created the URL-shortening logic 112 (and possibly the application 111), or they may be under the control of a completely separate third party.

For simplicity, FIG. 1 depicts only one client 110 and one server 120, although it is appreciated that there could be any number of each. For example, the client 110 could use any number of different servers 120 and URL shortening services 121, with the choice of which URL shortening service 121 to use being an option that is configurable within the application 111. Similarly, a given URL shortening service 121 might be replicated or otherwise distributed across multiple servers 120 for purposes such as load balancing.

The network 140 represents the communication pathways between the client 110 and the server 120. In one embodiment, the network 140 uses standard Internet communications technologies and/or protocols. Thus, the network 140 can transmit data using technologies such as Ethernet, 802.11, integrated services digital network (ISDN), asynchronous transfer mode (ATM), etc. Similarly, the networking protocols used on the network 140 can include the transmission control protocol/Internet protocol (TCP/IP), the hypertext transport protocol (HTTP), the simple mail transfer protocol (SMTP), the file transfer protocol (FTP), the extensible messaging and presence protocol (XMPP), etc. The data exchanged over the network 140 can be represented using technologies and/or formats including the hypertext markup language (HTML), the extensible markup language (XML), JavaScript object notation (JSON), the really simple syndication (RSS) format, etc. In addition, all or some links can be encrypted using conventional encryption technologies such as the secure sockets layer (SSL), transport layer security (TLS), secure HTTP (HTTPS) and/or virtual private networks (VPNs). In another embodiment, the entities can use custom and/or dedicated data communications technologies instead of, or in addition to, the ones described above.

Figure 2A:
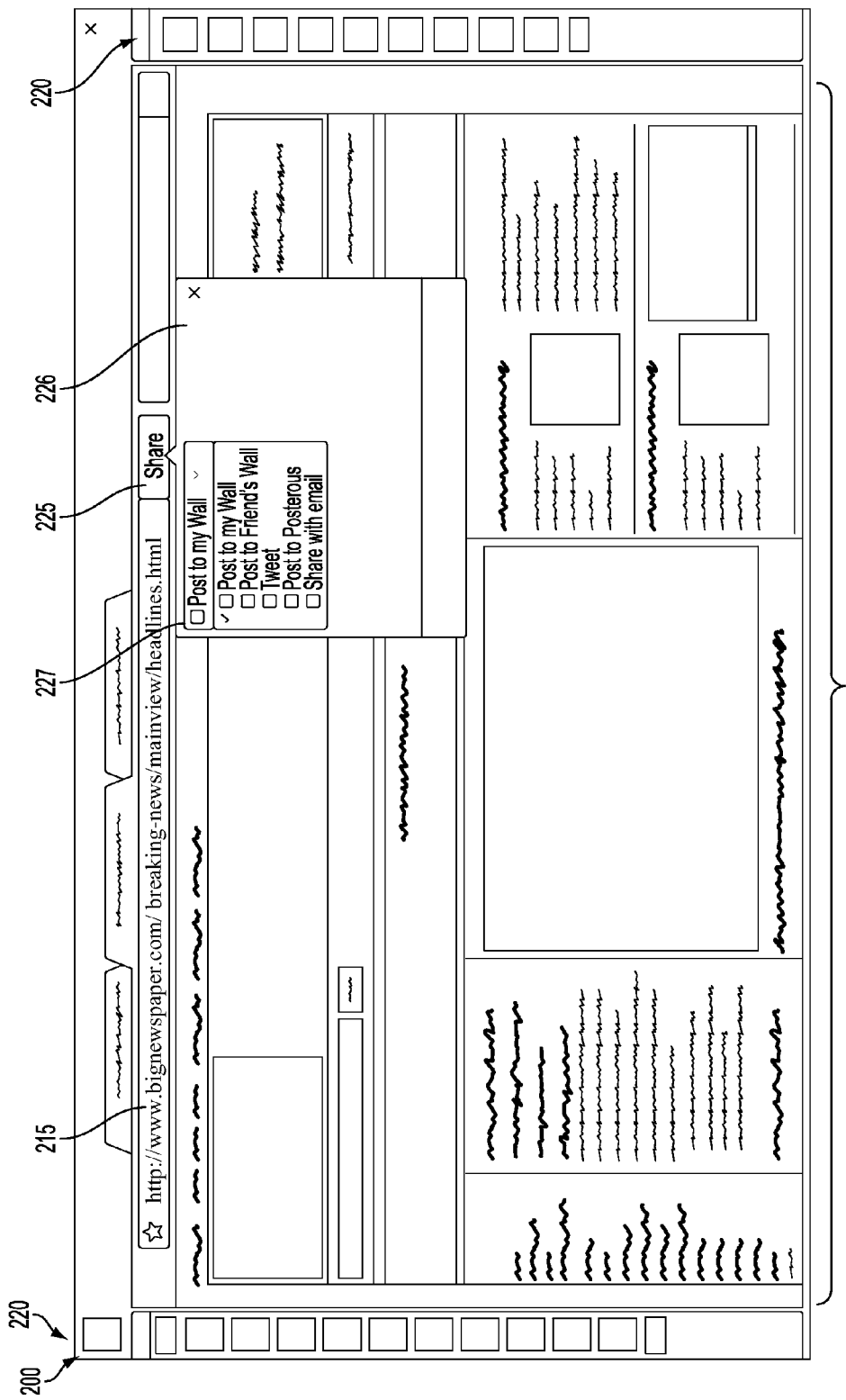
FIG. 2A is a screenshot of an example user interface in a window of a web browser application in which embodiments of the present invention operate.

FIG. 2A is a screenshot of an example user interface 200 in a window of a web browser application 111 in which embodiments of the present invention operate. The user interface 200 comprises functionality enabling sharing of a URL, including functionality for displaying and enabling selection of shortened versions of the URL. More specifically, the user interface 200 comprises a content area 210 configured to display the content of a document—e.g., the web page corresponding to the URL http://www.bignewspaper.com/breaking-news/mainview/headlines.html, as shown in URL entry area 215.

The user interface 200 additionally comprises areas of the browser "chrome" 220, i.e., portions of the browser window, distinct from the content area 210, that are not used to display rendered network-accessible documents.

In particular, the chrome of the user interface 200 of FIG. 2A comprises a share button 225 that allows sharing of the content currently displayed within the content area 210, such as the web page corresponding to the URL in the URL entry area 215. Selecting the share button 225 causes display of a URL sharing interface 226. The URL sharing interface 226 also allows a user to select, via a selection list 227, a service for sharing the URL. For example, the selection list 227 of FIG. 2A depicts a choice of five possible services for sharing the URL, including two options for posting to various user pages of a social networking site such as FACEBOOK, an option for sending via a microblogging and social networking service such as TWITTER, an option for posting to a blogging site such as POSTEROUS, and an option for sending via email.

Figure 2B:
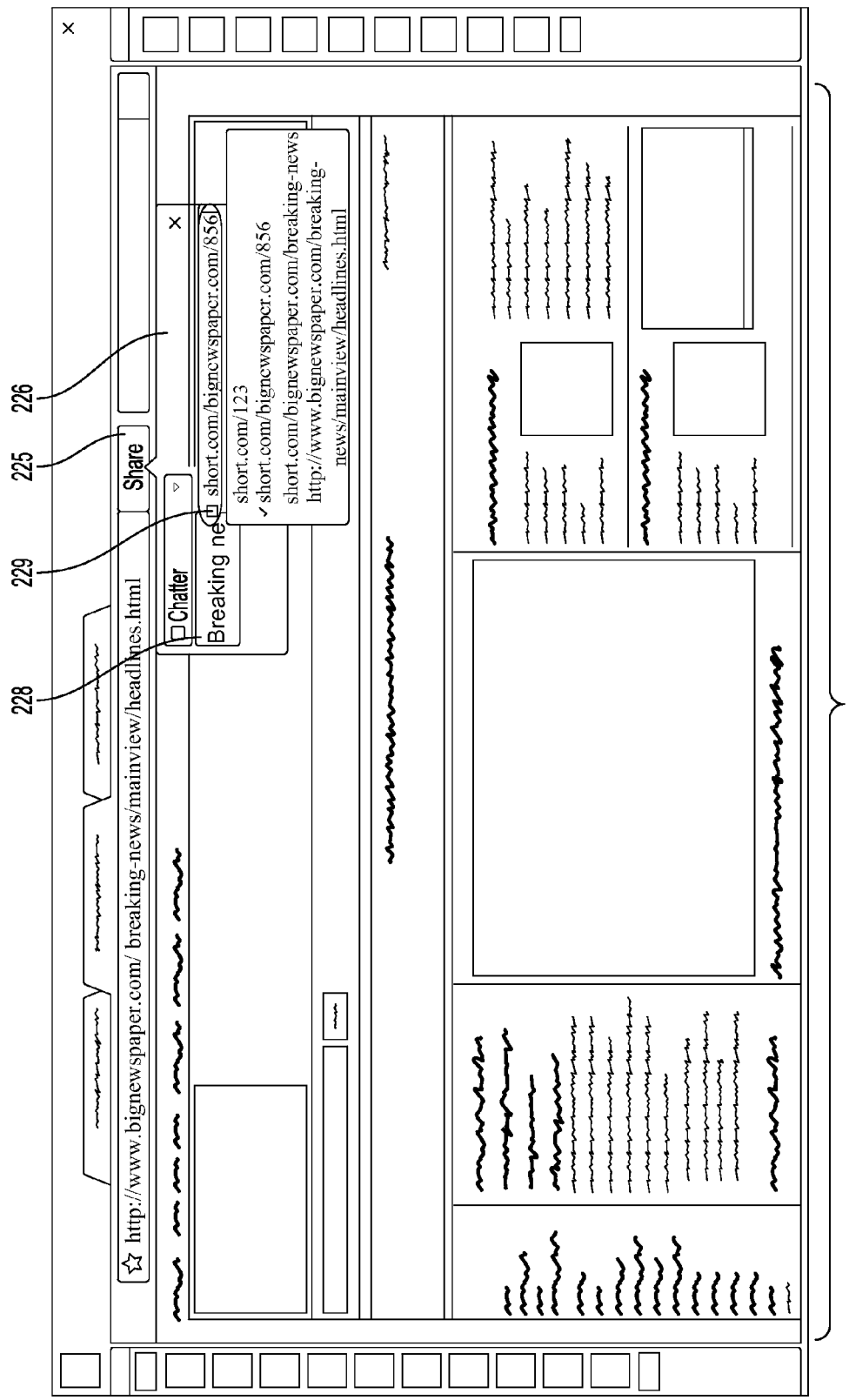
FIG. 2B is a screenshot of the user interface, more specifically illustrating the display of a plurality of shortened URL candidates.

FIG. 2B depicts the user interface 200 after a user chooses the third option of the selection list 227 of FIG. 2A: sharing via a fictitious microblogging and social networking service, Chatter, in which users send text messages of no more than 140 characters. The URL sharing interface 226 has consequently changed to display the sharing options appropriate for the Chatter service, such as a text entry area 228 in which the user can enter text of the message to be sent. The text entry area 228 may be pre-populated with default text, such as the title of the web page or other document being shared, which the user can modify as desired, and the text of the URL corresponding to the web page. The URL sharing interface 226 further comprises a shortened URL selection list 229 that presents the user with a set of shortened URL candidates from which to choose, the chosen shortened URL candidate replacing the original URL within the message of the text entry area 228.

The URL selection list 229 in the particular example of FIG. 2B contains four shortened URL candidates: short.com/123, short.com/bignewspaper.com/856, short.com/bignewspaper.com/breaking-news, and http://www.bignewspaper.com/breaking-news/mainview/headlines.html. The four candidates are arranged in order from most to least shortened, each successively containing more information about the source and content of the shared web page to which the original URL corresponds. For example, the first candidate, short.com/123, conveys no information about the source or content of the page, instead just having the domain name of the URL shortening service (i.e., short.com) and an appended random identifier (i.e., 123). The second candidate, short.com/bignewspaper.com/856, additionally includes the source of the page (i.e., the domain bignewspaper.com) in the path portion of the URL. The third candidate, short.com/bignewspaper.com/breaking-news, additionally includes a portion of the path of the original URL (i.e., /breaking-news). The fourth candidate is the original, unshortened URL. Although the example of FIG. 2B depicts four shortened URL candidates strictly ordered in increasing degrees of information conveyed, it is appreciated that any number of shortened URL candidates can presented to a user, and in any order.

In one embodiment, the shortened URL candidates displayed in the selection list 229 also change dynamically based on changes to text within the text entry area 228. For example, the application 111 can determine the maximum message length (if any) associated with a particular sharing services chosen from the selection list 227, as well as the number of characters already present within the text entry area 228, and calculate how many characters remain available for shortened URLs. (In one embodiment, the application 111 has a priori knowledge of maximum message lengths of the various sharing techniques of the selection list 227.) Then, based on the number of available characters, the application 111 may display a different set of shortened URL candidates. For example, if the user reduces the number of characters present within the text entry area 228 (e.g., by deleting some text), then the application 111 could display additional, longer candidates. Similarly, if the user increased the number of characters present (e.g., by typing or pasting additional text), the application 111 could stop displaying candidates that now exceeded the remaining number of available characters, or could continue to display them but mark them as unselectable, such as by displaying them in pale grey text.

It is appreciated that the shortened URL selection list 229 or other means of selecting a shortened URL need not occur solely within the context of use of the sharing button 225, nor even within the context of a web browser, but rather could be used in any portion of a user interface of an application 111 in which a shortened URL is desired. Further, it is not limited to use with URLs embedded in messages sent via microblogging services, but can be used with any means for sharing a URL.

Figure 3:
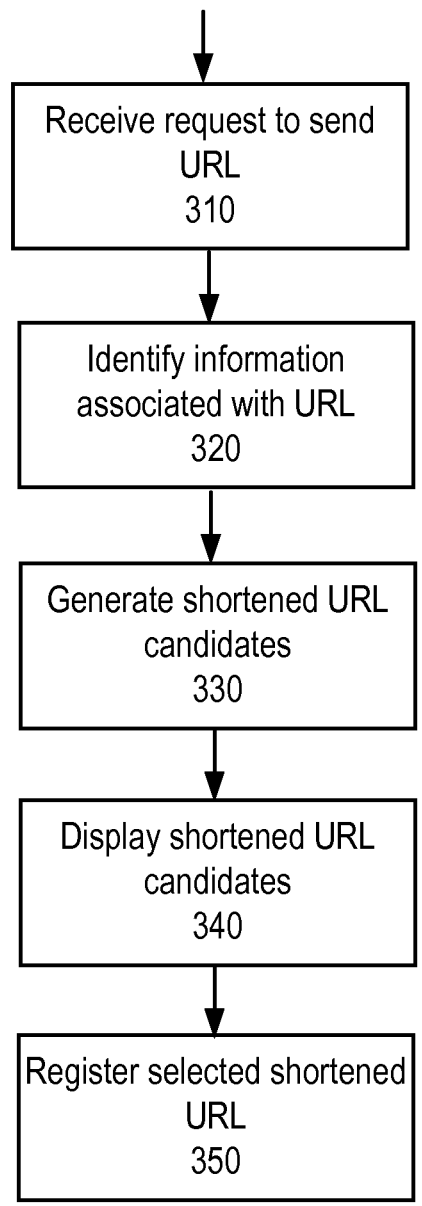
FIG. 3 is a flowchart of a process for adaptively generating a shortened link, according to one embodiment.

FIG. 3 is a flowchart of a process for adaptively shortening a URL, according to one embodiment. Initially, the application 111 of the client 110 of FIG. 1 receives 310 a request to send a URL to some destination. For example, referring back to FIGS. 2A-B, the request could be the user's selection of one of the sharing options of sharing selection menu 227, such as the Chatter service for sending text messages.

In order to generate the various shortened URL candidates, information associated with the URL is then identified 320. In one embodiment, this information that is identified includes the text of the URL itself—that is, segments of its domain and/or path components. (A "segment" refers to a logical, meaningful portion of the domain and/or path, such as portions of the URL text delimited by period (.) or slash (/) characters. For example, for the domain www.interestingsite.com, "www.interestingsite.com", "interestingsite.com", and "mysite" would be examples of segments, but meaningless snippets such as "inte", "gsite", and "s" would not. Similarly, for the pathname presentations/gkchesterton/2006/essays.html, segments would include "presentations/gkchesterton/2006", "gkchesterton/presentations", "presentations/gkchesterton", "presentations/2006", "2006/esssays", and "essays", for example.) In another embodiment, the information that is identified additionally and/or alternatively includes information from the content of the document pointed to be the URL, such as key words extracted from the document title (e.g., "Canadian pharmacy"), or semantically representative keywords derived based on analysis of the document content. In another embodiment, the information that is identified additionally and/or alternatively includes a rating of the content of the document pointed to by the URL. For example, the rating could represent the degree to which the content might be considered offensive, with ratings such as "G", "PG", "R", "X", or the like. Thus, original URLs http://some.porn.site/images/more/current/all.html and http://kidstoys.com/weeklyspecials/inoffensive/cuddlyanimals.html might be associated with ratings "X" and "G", respectively. As another example, the rating could represent the perceived quality of the content according to some individual or organization. Ratings are specified in a number of different ways in different embodiments. For example, in one embodiment the rating is generated by the site generating the content pointed to by the URL—e.g., self-rating of potential offensiveness—and embedded within the content, such as within an XML tag. In another embodiment, the ratings are generated by the URL-shortening service 121 via an editorial mechanism, such as an automated content analysis module that analyzes the content to estimate (for example) how potentially offensive the content is based on keywords within the content. In another embodiment, the ratings are generated over time by a community of users who viewed and rated the content. For example, users might use their applications 111 to specify ratings (e.g., "PG" for offensiveness or "4-star" for quality) for the content, and the ratings could then be aggregated, averaged, and stored by the URL-shortening logic 112 and/or 122.

The shortened URL candidates are then generated 330 based at least in part on the identified information. The domain of the shortened URLs is set to that of the URL shortening service 121, and the path of the shortened URL can be set to comprise a variety of different types of identified information. For example, the path can be set to comprise the domain of the original URL, or portions of the path of the URL, such as the "bignewspaper.com" and "/breaking-news" of the second and third candidates from selection list 229 of FIG. 2B. Additionally, the path can be set to comprise randomly-generated text, such as "123" or "856" from the first, second, and third candidates of FIG. 2B. Further, the path can be set to comprise the information from the content of the document pointed to be the URL, which further provides the user viewing the shortened URL with a sense of the true nature of the information. For example, if the keywords "get rich quick" were extracted from a web page (either literally, or by determining through techniques such as machine learning that the content of the web page is semantically associated with the phrase "get rich quick") they could then be embedded in the shortened URL, thus alerting a recipient of the URL that the linked page is unlikely to be of interest. Additionally or alternatively, the path can be set to comprise the determined ratings associated with the content, such as "PG" or "4-star," thereby providing a sense of the opinions of others about the content.

This identification 320 of information associated with the URL, and the generation 330 of the shortened URL candidates, can be performed by the URL-shortening logic 112 or 122, which as previously noted, can be located on client 110 or on the server 120, respectively. If steps 320 and 330 are performed by URL-shortening logic 122 on the server 120, then the URL-shortening logic 122 sends the resulting shortened URL candidates to the application 111 on the client 110 for use.

With the shortened URL candidates generated 330, the application 111 displays 340 the shortened URL candidates, e.g., within the selection list 229 of FIG. 2B. One of the candidates may be marked as the default, such as a candidate conveying the most information (e.g., the longest candidate), or a candidate with a particular predetermined type of information, such as the domain component of the original URL. The user then selects one of the shortened URL candidates (or accepts the default) and ultimately sends the selected shortened URL, e.g., within the message of text entry area 228 using the service specified in selection list 227.

In an embodiment in which the shortened URL candidates are generated 330 using the URL-shortening logic 112 of the client 110, the URL-shortening logic 112 can be configured to contact the URL shortening service 121 to verify that each of the candidates is in fact available before the candidates are displayed 140 to the user.

With the selected shortened URL sent, the recipient or other viewer of the shortened URL will need to be able to obtain the original URL based on it in order to obtain the content to which the original URL points. Thus, the selected shortened URL is registered 350 with the URL shortening service 121, such as by the application 111 automatically using a web service provided by the URL shortening service 121 to associate the original URL and the selected shortened URL.

In one embodiment, the client 110 and/or the server 120 ensure that the shortened URL candidates displayed 340 to the user on the client 110 remain available to the user until the registering 350—that is, they ensure that no other user registers one of the shortened URL candidates with the server 120 before the user makes his or her choice. This is accomplished in different ways in different embodiments. In one embodiment, all of the shortened URL candidates are simply registered at the time that they are generated 330, thus preventing them from being re-registered. In another embodiment, the shortened URL candidates are reserved with the server 120 for a predetermined amount of time, e.g., 10 minutes, during which none of the candidates can be provided as candidates to, or registered by, a client other than the client 110 for which the candidates were first generated. After the end of the predetermined period, the server 120 releases any candidates not registered. In another embodiment, the shortened URL candidates are reserved for exclusive use by the client 110 until explicitly released. For example, the shortened URL candidates might be temporarily reserved or registered with the server 120 until the server 120 receives a notification that the client 110 has registered one of the candidates. In one embodiment, instead of specifically requiring reservation for, or release by, the client 110, the server 120 equivalently requires that a candidate be registered only in association with the original URL for which the candidate was first generated. These various techniques are accomplished differently in embodiments in which the URL-shortening logic 112 of the client 110 generates the candidates, and in embodiments in which the URL-shortening logic 122 of the sever 120 generates the candidates. For example, in the former embodiment the client 110 sends requests to the URL-shortening service 121 to reserve the candidates, messages releasing the non-registered candidates, and the like.

It is appreciated that although the generation of a shortened URL has been described in the context of generating and presenting to a user a plurality of shortened URL candidates, the generation of a shortened URL using the above-described identification of information associated with the URL may be performed in other contexts, as well. As one example, a shortened URL incorporating segments of the domain and/or path components of an original URL may be automatically generated and embedded in a message, in a webpage, or in any other location in which a URL can be placed, with or without presenting a user with other candidates from which to choose, and with or without any input whatsoever from the user. For example, embodiments of the present invention might automatically place a shortened URL, shortened according to any of the above-disclosed techniques, into an email referencing a particular web page.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   receiving a request to create a message, the request including an original link, the original link comprising address text that points to a document;
   receiving a selection of a service, the selected service having an associated maximum message character length of messages that can be transmitted via the selected service;
   providing for display via a client device, a plurality of shortened link candidates for the original link, the shortened link candidates based on the maximum message character length of messages that can be transmitted via the selected service and on a number of characters currently in the message such that, for each of the shortened link candidates, the number of characters currently in the message and a number of characters in a corresponding one of the shortened link candidates together do not exceed the maximum message character length;
   receiving, from the client device, a designation of one of the plurality of shortened link candidates; and
   registering the designated shortened link candidate with a remote link-shortening server, responsive to the received selection of the shortened link candidate.

2. The computer-implemented method of claim 1, the actions further comprising:
   providing for display via a user interface:
      content associated with the original link, and
      a user interface element for sharing the content;
   wherein receiving the request to create the message comprises a user triggering the user interface element for sharing the content and selecting the service used to send the message.

3. The computer-implemented method of claim 1, wherein the request and the selection are received via a user interface of a web browser, and wherein the candidates are displayed within the user interface of the web browser.

4. The computer-implemented method of claim 1, wherein registering the designated shortened link candidate with the link-shortening service comprises registering an association between the original link and the designated shortened link candidate.

5. The computer-implemented method of claim 1, further comprising:
   receiving a set of ratings for content of the document from a plurality of users; and
   determining a rating of the content of the document based at least in part on the set of ratings;
   wherein at least one of the plurality of shortened link candidates comprises a text string containing the rating.

6. The computer-implemented method of claim 5, wherein the rating of the content of the document represents a degree of offensiveness of the content and is generated by a site that generated the content.

7. The computer-implemented method of claim 5, wherein the rating of the content of the document represents a degree of quality of the content based on ratings of the content generated by a community of users.

8. The computer-implemented method of claim 1, further comprising:
   deriving a keyword from content of the document;
   wherein at least one of the plurality of shortened link candidates comprises a text string that includes the derived keyword within the text string.

9. The method of claim 1, wherein the selected service is email, text, or a microblogging service.

10. The method of claim 1, wherein the number of characters currently in the message is a number of characters in a text entry area of an interface associated with the selected service.

11. The method of claim 1, further comprising:
    embedding the selected shortened link candidate in the message; and
    sending the message via the selected service.

12. A non-transitory computer-readable storage medium having executable computer program instructions embodied therein, the instructions comprising:
    instructions for receiving a request to create a message, the request including an original link, the original link comprising address text that points to a document;
    instructions for receiving a selection of a service, the selected service having an associated maximum message character length of messages that can be transmitted via the selected service;
    instructions for providing for display via a client device, a plurality of shortened link candidates for the original link, the shortened link candidates based on the maximum message character length of messages that can be transmitted via the selected service and on a number of characters currently in the messages such that, for each of the shortened link candidates, the number of characters currently in the message and a number of characters in a corresponding one of the shortened link candidates together do not exceed the maximum message character length;

instructions for receiving, from the client device, a designation of one of the plurality of shortened link candidates; and instructions for registering the designated shortened link candidate with a remote link-shortening server, responsive to the received selection of the shortened link candidate.

13. A non-transitory computer-readable storage medium, the non-transitory computer-readable storage medium comprising:

instructions for receiving, from a client device, an original link and a request to generate a shortened link for the original link;

instructions for generating a plurality of shortened link candidates for the original link based on a current length of a message in which a designated one of the shortened link candidates will be embedded and on a maximum message character length of messages that can be transmitted via a service such that, for each of the shortened link candidates, the current length of the message and a number of characters in a corresponding one of the shortened link candidates together do not exceed the maximum message character length;

instructions for receiving, from the client device, a designation of one of the plurality of shortened link candidates; and instructions for registering the designated shortened link candidate as a shortened link corresponding to the original link.

14. The non-transitory computer-readable storage medium of claim 10, further comprising instructions for re-generating the plurality of shortened link candidates responsive to a user changing the current length of the message by altering text of the message.

15. The non-transitory computer-readable storage medium of claim 13, wherein registering the selected candidate with the URL-shortening service comprises registering an association between the original link and the designated shortened link candidate.

16. The non-transitory computer-readable storage medium of claim 13, further comprising instructions for preventing, before the designation of one of the plurality of candidates is received, registration of any of the plurality of shortened link candidates in association with a link other than the original link.

17. The non-transitory computer-readable storage medium of claim 16, wherein the preventing comprises registering all of the candidates.

18. The non-transitory computer-readable storage medium of claim 16, wherein the preventing comprises:
reserving the shortened link candidates; and
responsive to the registering of the designated shortened link candidate, requesting release of non-selected ones of the plurality of shortened link candidates.

19. The non-transitory computer-readable storage medium of claim 16, wherein the preventing comprises reserving the candidates with the remote link-shortening server for a predetermined amount of time.

20. The non-transitory computer-readable storage medium of claim 13, further comprising instructions for:
deriving a keyword from content pointed to by the original link;
wherein at least one of the plurality of shortened link candidates comprises text that includes the derived keyword.

21. The non-transitory computer-readable storage medium of claim 13, further comprising:
instructions for receiving from a plurality of users a set of ratings for content pointed to by the original link; and
determining a rating of the content of the document based at least in part on the set of ratings;
wherein at least one of the plurality of shortened link candidates comprises a text string containing the rating.

22. The non-transitory computer-readable storage medium of claim 21, wherein the rating of the content of the document represents a degree of offensiveness of the content and is generated by a site that generated the content.

23. The non-transitory computer-readable storage medium of claim 21, wherein the rating of the content of the document represents a degree of quality of the content based on ratings of the content generated by a community of users.

24. The non-transitory computer-readable storage medium of claim 13, wherein at least one of the shortened link candidates comprises at least one of text of the original link or content pointed to by the original link.

* * * * *